(12) United States Patent
Park

(10) Patent No.: US 12,332,718 B2
(45) Date of Patent: Jun. 17, 2025

(54) SYSTEM ON CHIP AND SEMICONDUCTOR DEVICE INCLUDING THE SAME

(71) Applicant: SAMSUNG ELECTRONICS CO., LTD., Suwon-si (KR)

(72) Inventor: Kyung-Min Park, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 73 days.

(21) Appl. No.: 18/316,697

(22) Filed: May 12, 2023

(65) Prior Publication Data
US 2024/0036627 A1   Feb. 1, 2024

(30) Foreign Application Priority Data
Jul. 28, 2022   (KR) .................. 10-2022-0094002

(51) Int. Cl.
| | | |
|---|---|---|
| *G06F 1/324* | (2019.01) | |
| *G06F 1/20* | (2006.01) | |
| *G06F 1/3206* | (2019.01) | |
| *G06F 1/3287* | (2019.01) | |
| *G06F 1/3296* | (2019.01) | |

(52) U.S. Cl.
CPC .............. *G06F 1/324* (2013.01); *G06F 1/203* (2013.01); *G06F 1/3206* (2013.01); *G06F 1/3287* (2013.01); *G06F 1/3296* (2013.01)

(58) Field of Classification Search
CPC ........ G06F 1/324; G06F 1/206; G06F 1/3203; G06F 9/5094; G06F 1/203; G06F 1/3206; G06F 1/3287; G06F 1/3296
See application file for complete search history.

(56) References Cited

U.S. PATENT DOCUMENTS

| | | | |
|---|---|---|---|
| 7,051,227 B2 | 5/2006 | Kazachinsky et al. | |
| 7,131,016 B2 | 10/2006 | Oh et al. | |
| 7,536,575 B2 | 5/2009 | Adachi | |
| 9,575,537 B2 | 2/2017 | Ignowski et al. | |
| 2014/0223219 A1* | 8/2014 | Aelion | G06F 1/3206 |
| | | | 713/400 |

(Continued)

FOREIGN PATENT DOCUMENTS

| | | |
|---|---|---|
| CN | 114637387 A * | 6/2022 |
| KR | 10-2013-0136266 | 12/2013 |
| KR | 10-2021-0037548 | 4/2021 |

*Primary Examiner* — Jaweed A Abbaszadeh
*Assistant Examiner* — Hyun Soo Kim
(74) *Attorney, Agent, or Firm* — MORGAN, LEWIS & BOCKIUS LLP

(57) ABSTRACT

A system on chip and semiconductor device including the same are provided. The system on chip comprises a plurality of functional blocks, a frames per second (FPS) meter measuring FPS based on data processed by the functional blocks, a thermal management unit (TMU) sensing a temperature of each of the functional blocks, a dynamic voltage frequency scaling (DVFS) controller performing DVFS on the functional blocks, and a power management unit (PMU) independently controlling the power of the functional blocks, wherein the DVFS controller checks the FPS for the functional blocks when an operating frequency of each of the functional blocks is limited and limits the operating frequency of the at least one of the functional blocks to a threshold value or less using the FPS checked by the DVFS controller and the temperature of each of the functional blocks.

20 Claims, 12 Drawing Sheets

(56) References Cited

U.S. PATENT DOCUMENTS

2016/0225339 A1* 8/2016 Kim .................... G09G 3/20
2017/0031430 A1* 2/2017 Ansorregui .......... G06F 1/3206
2022/0165191 A1* 5/2022 Yao .................... G09G 5/006

* cited by examiner

FIG. 5

|  | FB 1 | FB 2 | FB 3 | FB 4 | FB 5 |
|---|---|---|---|---|---|
| Running Frequency | 800Mhz | 1.5Ghz | 1456Mhz | 200Mhz | 772Mhz |

FIG. 6

|  | FPS | Frame Drop (%) |
|---|---|---|
| Default (IP 2 1.5Ghz) | FPS 1 | - |
| FB 2 1.1Ghz Look | FPS 2 | 0.24% |
| FB 2 600Mhz Look | FPS 3 | 0.95% |

(FPS 1 > FPS 2 > FPS 3)

FIG. 10

|  | Default (FB 2 1.5Ghz) | FB 2 600Mhz Lock |
|---|---|---|
| Throttling Count | 55 | 6 |

SYSTEM ON CHIP AND SEMICONDUCTOR DEVICE INCLUDING THE SAME

This application claims priority under 35 U.S.C. § 119 to Korean Patent Application No. 10-2022-0094002, filed on Jul. 28, 2022, in the Korean Intellectual Property Office, the disclosure of which is incorporated by reference herein in its entirety.

TECHNICAL FIELD

Embodiments of the present disclosure relate to a system on chip (SoC) and a semiconductor device including the same.

DISCUSSION OF RELATED ART

In mobile environments, application processors are widely used in mobile devices, such as a smartphone or a tablet device. An application processor may be implemented in the form of a system on chip (SoC). The SoC refers to a computer or electronic system component integrated into a single integrated circuit and is generally used in an embedded system area.

Competition for higher performance, diversification of functions, and reduction in size of mobile devices is intensifying. One way that these trends are being advanced is through the inclusion of functional blocks (FBs) in the application processors.

When the temperature of an SoC or a mobile device is continuously high, a method of lowering an operating frequency of an FB through dynamic voltage frequency scaling (DVFS) may be used. The DVFS is a technology for dynamically adjusting an operating frequency and an operating voltage of the FB.

If the operating frequency of an FB is lowered, the performance of a mobile device perceived by a user may be degraded.

SUMMARY

Aspects of the present disclosure provide a system on chip (SoC) performing throttling while reducing a decrease in performance perceived by a user.

Aspects of the present disclosure also provide a semiconductor device performing throttling while reducing a decrease in performance perceived by a user.

Aspects of the present disclosure are not restricted to examples set forth herein. The above and other aspects of the present disclosure will become more apparent to one of ordinary skill in the art to which the present disclosure pertains by referencing the detailed description of the present disclosure given below.

According to an aspect of the present disclosure, there is provided a system on chip comprising a plurality of functional blocks, a frames per second (FPS) meter measuring FPS based on data processed by the functional blocks, a thermal management unit (TMU) sensing a temperature of ach of the functional blocks, a dynamic voltage frequency scaling (DVFS) controller performing DVFS on the functional blocks, and a power management unit (PMU) independently controlling the power of the functional blocks, wherein the DVFS controller checks the FPS for the functional blocks when an operating frequency of at least one of the functional blocks is limited and limits the operating frequency of the at least one of the functional blocks to a threshold value or less using the FPS checked by the DVFS controller and the temperature of each of the functional blocks.

According to another aspect of the present disclosure, there is provided a system on chip comprising a first functional block, a second functional block, an FPS meter measuring FPS based on data processed by the first functional block and the second functional block, a TMU sensing a first temperature of the first functional block and a second temperature of the second functional block, and a DVFS controller performing DVFS on the first functional block and the second functional block, wherein the DVFS controller limits an operating frequency of the first functional block to a threshold value or less and does not limit an operating frequency of the second functional block to the threshold value or less in response to a first reduction in the FPS when the operating frequency of the first functional block is limited being smaller than a second reduction in the FPS when the operating frequency of the second functional block is limited and in response to a reduction in the temperature of the first functional block when the operating frequency of the first functional block is limited being greater than a reduction in the temperature of the second functional block when the operating frequency of the second functional block is limited.

According to another aspect of the present disclosure, there is provided a semiconductor device comprising an SoC comprising a plurality of functional blocks, and a display device displaying an image based on data processed by the functional blocks, wherein the SoC comprises an FPS meter measuring FPS based on the image, a TMU sensing the temperature of the functional blocks, and a DVFS controller performing DVFS on the functional blocks, wherein the DVFS controller checks the FPS for the functional blocks when an operating frequency of each of the functional blocks is limited and limits the operating frequency of at least one of the functional blocks to a first threshold value or less using the FPS checked by the DVFS controller and the temperature of the functional blocks.

BRIEF DESCRIPTION OF THE DRAWINGS

These and/or other aspects will become apparent and more readily appreciated from the following description of the embodiments, taken in conjunction with the accompanying drawings in which:

FIGS. 5 through 7 are exemplary diagrams for explaining an operation of selecting a control target functional block using the DVFS controller 160 according to embodiments of the present disclosure.

FIG. 10 is an exemplary diagram for explaining an effect according to embodiments of the present disclosure.

DETAILED DESCRIPTION

Hereinafter, a system on chip (SoC) and a semiconductor device including the same according to embodiments of the present disclosure will be described with reference to the accompanying drawings.

Figure 1:
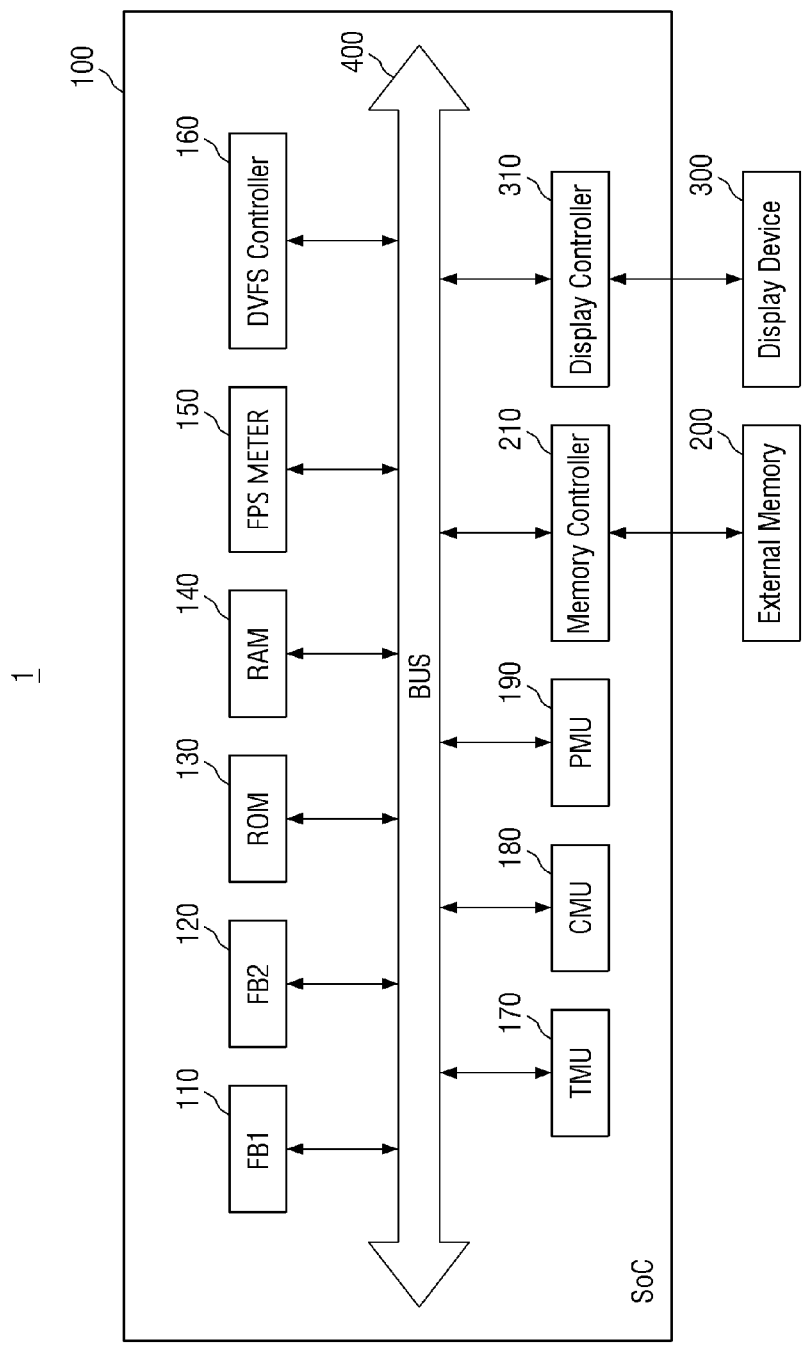
FIG. 1 is a block diagram of an electronic system 1 including an SoC 100 according to embodiments of the present disclosure.

FIG. 1 is a block diagram of an electronic system 1 including an SoC 100 according to embodiments of the present disclosure.

Referring to FIG. 1, the electronic system 1 may be implemented as a handheld device such as a mobile phone, a smartphone, a tablet personal computer (PC), a personal digital assistant (PDA), an enterprise digital assistant (EDA), a digital still camera, a digital video camera, a portable multimedia player (PMP), a personal navigation device or portable navigation device (PND), a handheld game console, or an e-book. The electronic system 1 may include the SoC 100, an external memory 200, and a display device 300. Embodiments of the present disclosure are not limited thereto, and the electronic system 1 may further include other elements (e.g., see FIG. 12) in addition to the illustrated elements.

The SoC 100 may include a first functional block (FB 1) 110, a second functional block (FB 2) 120, a read only memory (ROM) 130, a random access memory (RAM) 140, a frames per second (FPS) meter 150, a dynamic voltage frequency scaling (DVFS) controller 160, a thermal management unit (TMU) 170, a clock management unit (CMU) 180, a power management unit (PMU) 190, a memory controller 210, a display controller 310, and a bus 400. Embodiments of the present disclosure are not limited thereto, and the SoC 100 may further include other elements in addition to the illustrated elements.

Each of the functional blocks (FBs) may perform a specific function. Although only FB 1 110 and FB 2 120 are illustrated in FIG. 1, this is only for ease of description, and the SoC 100 may include three or more FBs. The FBs included in the SoC 100 are described with reference to FIG. 2.

Programs and/or data stored in the ROM 130, the RAM 140, and/or the external memory 200 may be loaded into a memory of a central processing unit (CPU) 111 (see FIG. 2) as needed. The ROM 130 may permanently store programs and/or data. The ROM 130 may be implemented as an erasable programmable read-only memory (EPROM) or an electrically erasable programmable read-only memory (EEPROM). The RAM 140 may temporarily store programs, data, or instructions. For example, programs and/or data stored in the ROM 130 or the external memory 200 may be temporarily stored in the RAM 140 under the control of the CPU 111 (see FIG. 2) or according to boot code stored in the ROM 130. The RAM 140 may be implemented as a dynamic RAM (DRAM) or a static RAM (SRAM).

The CMU 180 may generate and control an operation clock signal. The CMU 180 may include a clock signal generator such as a phase locked loop (PLL), a delayed locked loop (DLL), or a crystal oscillator. The operation clock signal may be supplied to a graphics processing unit (GPU) 114 (see FIG. 2). The operation clock signal may also be supplied to another element (e.g., the CPU 111 (see FIG. 2)) or the memory controller 210. The CMU 180 may change the frequency of the operation clock signal.

The memory controller 210 may interface with the external memory 200. The memory controller 210 may control the overall operation of the external memory 200 and control data exchange between a host and the external memory 200. For example, the memory controller 210 may write data to the external memory 200 or read data from the external memory 200 at the request of the host. Here, the host may be a master device such as the CPU 111 (see FIG. 2), the GPU 114 (see FIG. 2), or the display controller 310.

The external memory 200 may be a storage medium for storing data. The external memory 200 may store an operating system (OS), various programs, and/or various data. The external memory 200 may be, but is not limited to, a DRAM. For example, the external memory 200 may be a non-volatile memory (e.g., a flash memory, a phase change RAM (PRAM), a magnetic RAM (MRAM), a resistive RAM (RRAM), or a FeRAM). In some embodiments, the external memory 200 may be an internal memory of the SoC 100. In addition, the external memory 200 may be a flash memory, an embedded multimedia card (eMMC), or a universal flash storage (UFS). The elements of the SoC 100 including, for example, the FB 1 110, FB 2 120, ROM 130, RAM 140, FPS meter 150, DVFS controller 160, TMU 170, CMU 180, PMU 190, memory controller 210 and display controller 310 may communicate with each other through the bus 400.

The display device 300 may display image signals output from the display controller 310. For example, the display device 300 may be implemented as a liquid crystal display (LCD), a light emitting diode (LED) display, an organic LED (OLED) display, an active-matrix OLED (AMOLED) display, or a flexible display. The display controller 310 may control the operation of the display device 300. The FPS meter 150, the DVFS controller 160, and the TMU 170 are described in more detail with reference to FIG. 3.

Figure 2:
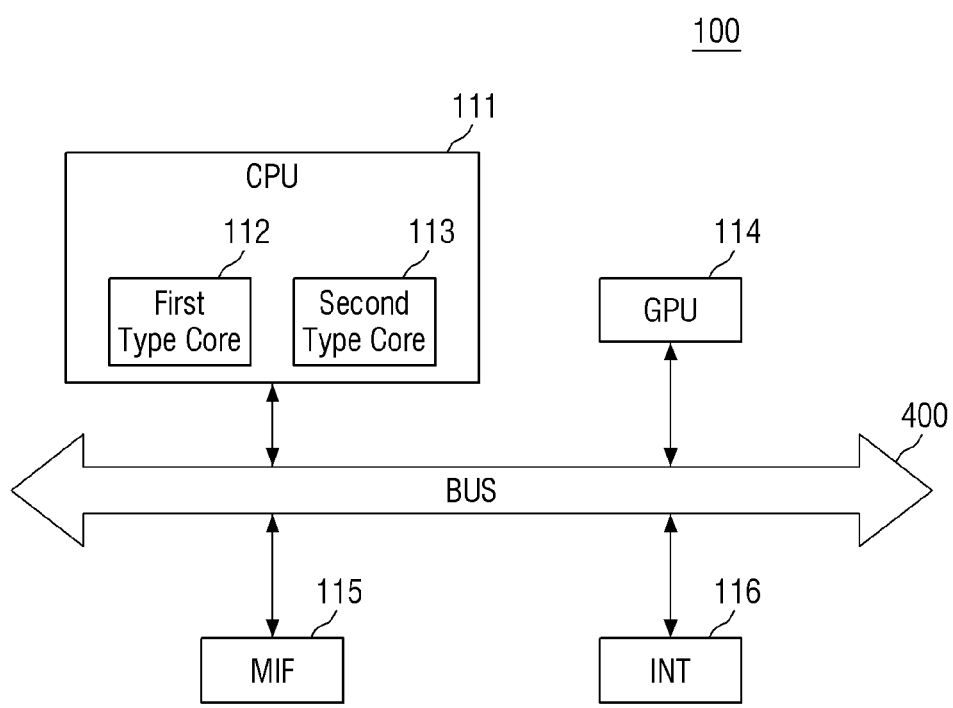
FIG. 2 is a block diagram of the SoC 100 of FIG. 1.

FIG. 2 is a block diagram of the SoC 100 of FIG. 1.

Referring to FIGS. 1 and 2, each of FB1 110 and FB2 120 may be implemented as the CPU 111, the GPU 114, a memory interface (MIF) 115, and an internal block (INT) 116. Embodiments of the present disclosure are not limited thereto, and each of FB 1 110 and FB 2 120 may also be implemented as a functional block such as a neural network processor (NPU), a communication processor (CP), a peripheral element interconnect (PCI), a digital signal processor (DSP), a wired interface, a wireless interface, embedded software, codec, a video module (e.g., a camera interface, a Joint Photographic Experts Group (JPEG) processor, a video processor, or a mixer), a three-dimensional (3D) graphics core, an audio system, or a driver.

The CPU 111, which may also be referred to as a processor, may process or execute programs and/or data stored in the external memory 200. For example, the CPU 111 may process or execute the programs and/or the data in response to an operation clock signal output from the CMU 180. The CPU 111 may be implemented as a multi-core processor. The multi-core processor is a computing component having two or more independent substantive processors (called 'cores'), and each of the processors may read and execute program instructions.

In some embodiments, the CPU 111 may include heterogeneous cores, for example, a first type core 112 and a second type core 113. According to an embodiment of the present disclosure, the CPU 111 may include a third type core in addition to the first type core and the second type core. In some embodiments of the present disclosure, the first type core 112 may correspond to a high-performance core, and the second type core 113 may correspond to a low-power core. In some embodiments of the present disclosure, FB 1 110 may be implemented as the first type core 112 and FB 2 120 may be implemented as the second type core 113. In some embodiments of the present disclosure, FB 1 110 may be implemented as the second type core 113 and FB 2 120 may be implemented as the first type core 112.

The CPU 111 assigns a task to the second type core 113 and measures a CPU load in the second type core 113 assigned with the task. When the measured CPU load exceeds the workload that can be performed by this low-power core, the CPU 111 may switch to the high-performance core. In addition, when determining that the workload being performed by the high-performance core can also be performed by the low-power core based on the measured CPU load, the CPU 111 may switch from the high-performance core to the low-power core. The CPU 111, the first type core 112, the second type core 113, the GPU 114, the MIF 115, and the INT 116 may communicate with each other through the bus 400.

Figure 3:
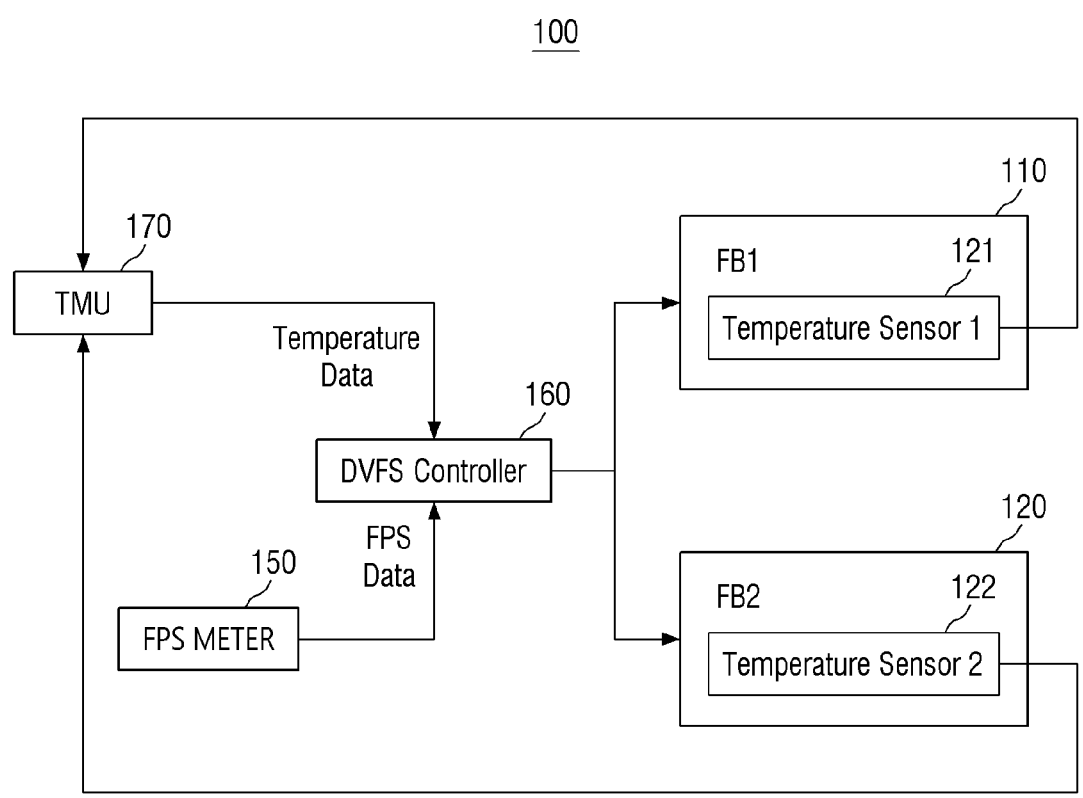
FIG. 3 is a block diagram illustrating the operation of the SoC 100 according to embodiments of the present disclosure.

FIG. 3 is a block diagram illustrating the operation of the SoC 100 according to embodiments of the present disclosure.

Referring to FIG. 3, the TMU 170 may receive temperature data of FB 1 110 from a first temperature sensor 121 inside FB 1 110. In addition, the TMU 170 may receive temperature data of FB 2 120 from a second temperature sensor 122 inside FB 2 120. The TMU 170 may provide the temperature data of the FBs to the DVFS controller 160.

The FPS meter 150 may measure frames per second (FPS) based on data processed by FB 1 110 and FB 2 120. The FPS may be the rate at which image data is displayed on a display screen when consecutive images are output to a display device. The FPS may be one performance indicator perceived by a user in various scenarios (e.g., 3D game, video call, camera operation, etc.) performed using the electronic system 1 (see FIG. 1). The FPS meter 150 may measure the FPS, for example, when data processed by FB 1 110 and FB 2 120 is output to the display device 300 (see FIG. 1) and may provide the FPS data to the DVFS controller 160.

The DVFS controller 160 may perform dynamic voltage frequency scaling (DVFS) on FB 1 110 and FB 2 120 based on the temperature data received from the TMU 170 and the FPS data received from the FPS meter 150. Although only FB 1 110 and FB 2 120 are illustrated in FIG. 3, embodiments of the present disclosure are not limited thereto, and the number of FBs whose operating voltage and operating frequency are controlled by the DVFS controller 160 may be three or more.

When the electronic system 1 (see FIG. 1) performs an operation such as 3D game, video call, or camera operation, the electronic system 1 may exhibit high performance as operating frequencies of the FB 1 110 and FB 2 120 included in the SoC 100 increase. However, as the operating frequencies of the FB 1 110 and FB 2 120 increase, the temperature of the SoC 100 may also increase. Therefore, for reasons such as the safety of a user of the electronic system 1 (see FIG. 1) or the reliability of the electronic system 1, the DVFS controller 160 may lower the temperature of the SoC 100 by performing a thermal throttling operation. For example, the DVFS controller 160 may lower the temperature of the SoC 100 to a target temperature. In one example, the target temperature is selected for user safety.

The DVFS controller 160 may selectively perform a DVFS operation on a plurality of FBs to perform a throttling operation for lowering the temperature of the SoC 100. For example, the DVFS controller 160 may limit the operating frequency of FB 1 110 to a threshold value or less and may not limit the operating frequency of FB 2 120. Alternatively, the DVFS controller 160 may not limit the operating frequency of FB 1 110 and may limit the operating frequency of FB 2 120 to the threshold value or less. Alternatively, the DVFS controller 160 may limit both the operating frequency of FB 1 110 and the operating frequency of FB 2 120 to the threshold value or less.

Here, the threshold value used as a criterion for limiting the operating frequencies of the FB 1 110 and FB 2 120 may vary depending on embodiments of the present disclosure. For example, the threshold value may vary according to the type of FB. In addition, the threshold value may vary according to the type of operation performed by the electronic system 1 (see FIG. 1). Criteria that may be used by the DVFS controller 160 to set the threshold value are described with reference to FIGS. 6 and 7.

Figure 4:
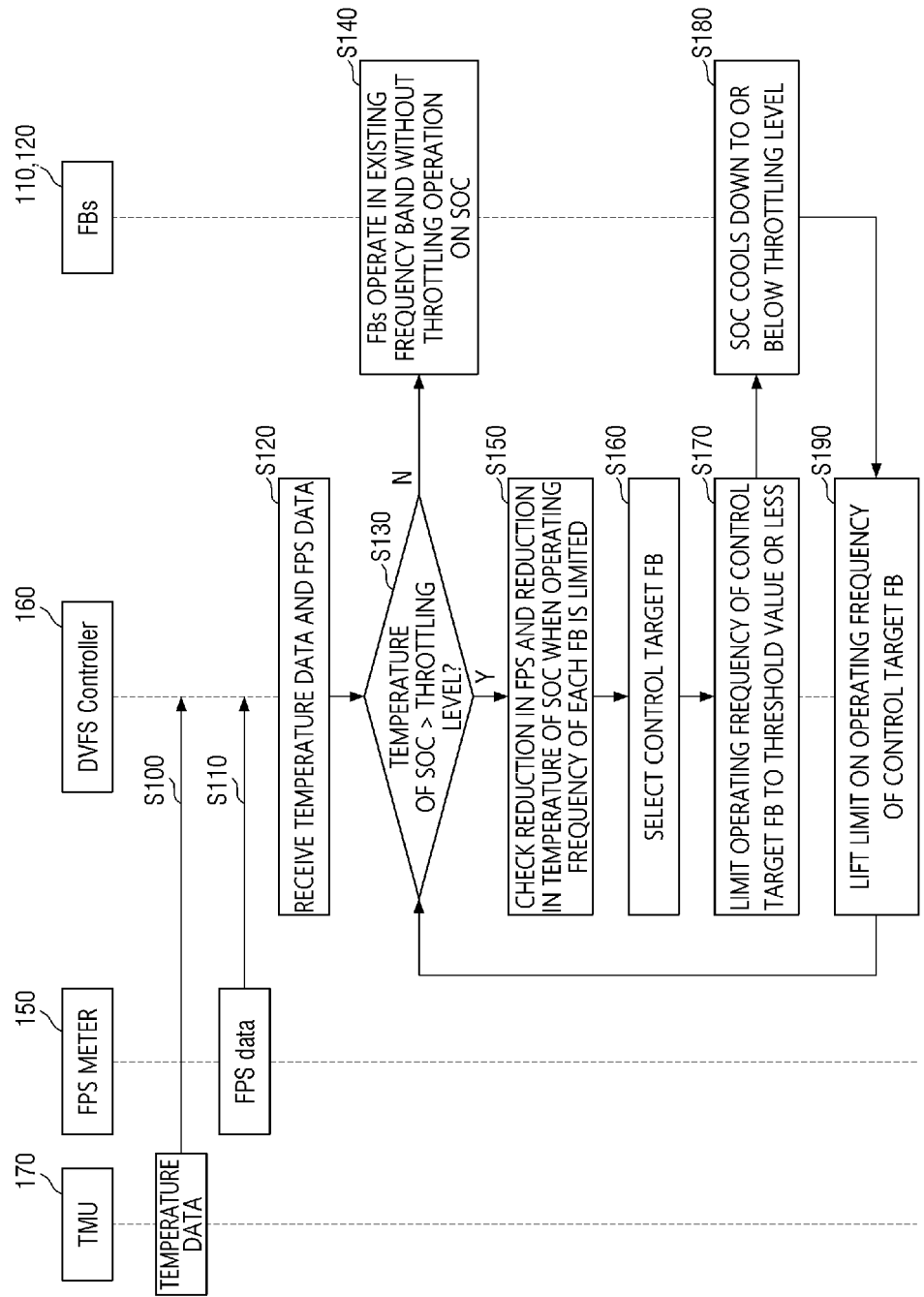
FIG. 4 is a flowchart illustrating the operation of the SoC 100 of FIG. 3.

FIG. 4 is a flowchart illustrating the operation of the SoC 100 of FIG. 3.

Referring to FIG. 4, when the TMU 170 operates, the TMU 170 may transmit temperature data of the FB 1 110 and FB 2 120 to the DVFS controller 160 (operation S100). The FPS meter 150 may transmit FPS data based on data processed by the FB 1 110 and FB 2 120 to the DVFS controller 160 (operation S110).

The DVFS controller 160 may receive the temperature data of the FB 1 110 and FB 2 120 from the TMU 170 and the FPS data from the FPS meter 150 (operation S120). The DVFS controller 160 may determine whether the temperature of the SoC 100 (see FIG. 1) is higher than a threshold value or a throttling level based on the temperature data of the FB 1 110 and FB 2 120 (operation S130). Herein, the threshold value and the throttling level may be used interchangeably.

If it is determined that the temperature of the SoC 100 (see FIG. 1) is not higher than the threshold value or the throttling level (operation S130-N), a throttling operation is not performed on the SoC 100 (see FIG. 1), and the DVFS controller 160 may not limit the operating frequencies of the FB 1 110 and FB 2 120 (operation S140). If it is determined that the temperature of the SoC 100 (see FIG. 1) is higher than the threshold value or the throttling level (operation S130-Y), the DVFS controller 160 may check a reduction in FPS and a reduction in the temperature of the SoC 100 (see FIG. 1) when the operating frequency of each of the FB 1 110 and FB 2 120 is limited (operation S150).

The DVFS controller 160 may select an FB (hereinafter, referred to as a control target FB), which causes a smallest reduction in the FPS when an operating frequency thereof is limited, from among the FBs, while effectively maintaining the temperature of the SoC 100 (see FIG. 1) at or below a threshold value or a throttling level (operation S160). The criteria and method used by the DVFS controller 160 to select the control target FB are described with reference to FIGS. 5 through 7.

The DVFS controller 160 limits the operating frequency of the control target FB to a threshold value or less (operation S170). Accordingly, a temperature of the SoC 100 (see FIG. 1) may be cooled to a temperature at or below the threshold value or the throttling level (operation S180). Therefore, the user of the electronic system 1 (see FIG. 1) equipped with the SoC 100 (see FIG. 1) may not perceive a frame drop, and the safety of the electronic system 1 (see FIG. 1) can be ensured.

Next, in response to the temperature of the SoC 100 (see FIG. 1) sensed by the TMU 170 dropping to a temperature at or below the throttling level, the DVFS controller 160 may lift the limit on the operating frequency of the control target FB (operation S190).

Figure 7:
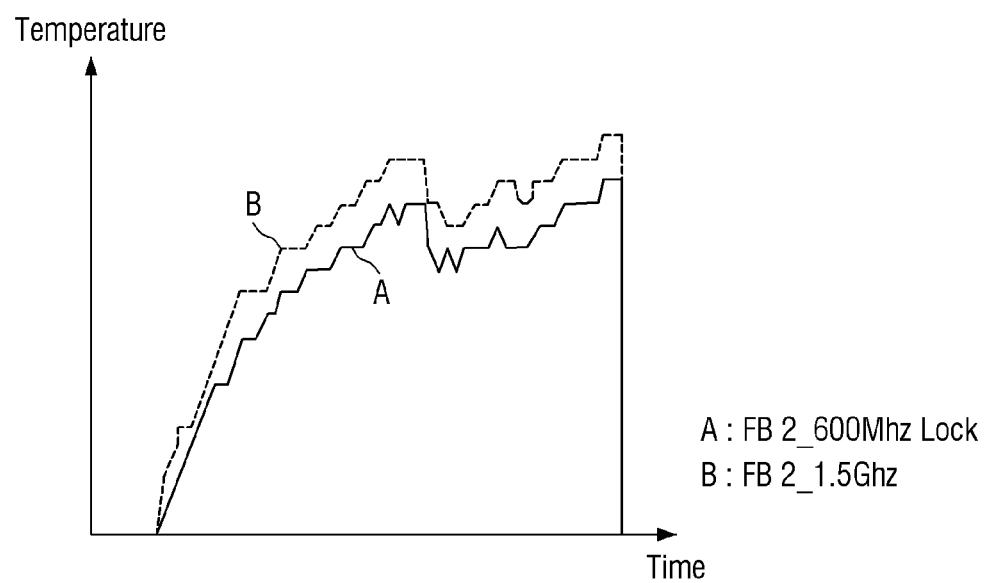

FIGS. 5 through 7 are exemplary diagrams for explaining an operation of selecting a control target FB using the DVFS controller 160 according to embodiments of the present disclosure.

Referring to FIG. 5, when the electronic system 1 (see FIG. 1) performs a specific operation (e.g., 3D game, video call, camera operation, etc.), the FBs of the SoC 100 (see FIG. 1) may operate at different frequencies. The operating frequency of each FB illustrated in FIG. 5 is only an example used for ease of description, and the operating frequency of each FB may vary depending on embodiments of the present disclosure. Although five FBs are illustrated in FIG. 5, this is only an example used for ease of description, and the number of FBs of the SoC 100 (see FIG. 1) may be more or less than five depending on embodiments of the present disclosure.

The DVFS controller 160 (see FIG. 3) may identify the operating frequency of each FB in a corresponding operation and select a control target FB which can be tuned to improve the problem of heat generation. Specifically, the DVFS controller 160 (see FIG. 3) may select at least one FB, which causes an FPS reduction within a range not perceived by a user of the electronic system 1 (see FIG. 1) when the operating frequency of the FB is limited, and which can effectively lower the temperature of the SoC 100 (see FIG. 1). The DVFS controller 160 (see FIG. 3) may select the at least one FB from among a plurality of FBs as a control target FB and may limit the operating frequency of the selected FB such that a temperature of the SoC 100 may be reduced to at or below a threshold value.

A case where FB 1 is implemented as the first type core 112 (see FIG. 2) of the CPU 111 (see FIG. 2) and FB 2 is implemented as the second type core 113 (see FIG. 2) will now be described as an example.

Referring to FIG. 5, it can be seen that the first type core 112 (see FIG. 2), which is a high-performance core, operates at 800 megahertz (Mhz), and the second type core 113 (see FIG. 2) operates at a relatively high frequency of 1.5 gigahertz (Ghz). Accordingly, the DVFS controller 160 (see FIG. 3) may limit the operating frequency of the second type core 113 (see FIG. 2) and check a reduction in FPS and a reduction in the temperature of the SoC 100 (see FIG. 1).

Referring to FIG. 6, it is assumed that the FPS when the operating frequency of the second type core 113 (see FIG. 2) is not limited (i.e., when the second type core 113 operates at 1.5 Ghz) is FPS 1, the FPS when the operating frequency of the second type core 113 (see FIG. 2) is limited to 1.1 Ghz or less is FPS 2, and the FPS when the operating frequency of the second type core 113 (see FIG. 2) is limited to 600 Mhz or less is FPS3. Here, FPS 1 may be greater than FPS 2, and FPS 2 may be greater than FPS 3.

A frame drop based on the FPS when the operating frequency of the second type core 113 (see FIG. 2) is limited to 1.1 Ghz or less may be 0.24% less than a frame drop based on the FPS when the operating frequency of the second type core 113 (see FIG. 2) is not limited. In addition, a frame drop based on the FPS when the operating frequency of the second type core 113 (see FIG. 2) is limited to 600 Mhz or less may be 0.95% less than the frame drop based on the FPS when the operating frequency of the second type core 113 (see FIG. 2) is not limited.

Referring to FIG. 7, plot A illustrates the temperature of the SoC 100 (see FIG. 1) when the operating frequency of the second type core 113 (see FIG. 2) is limited to 600 Mhz or less (FB 2_600 Mhz Lock). Plot B illustrates the temperature of the SoC 100 (see FIG. 1) when the operating frequency of the second type core 113 (see FIG. 2) is not limited (i.e., when the second type core 113 operates at 1.5 Ghz) (FB 2_1.5 Ghz). When the operating frequency of the second type core 113 (see FIG. 2) is limited to 600 Mhz or less, the temperature of the SoC 100 (see FIG. 1) can be effectively reduced compared with when the operating frequency of the second type core 113 (see FIG. 2) is not limited.

Here, assuming that the FPS range in which the user of the electronic system 1 (see FIG. 1) does not perceive a frame drop is 0.95% or less, the DVFS controller 160 (see FIG. 3) may select the second type core 113 (see FIG. 2) as a control target FB and perform throttling by limiting the operating frequency of the second type core 113 to 600 Mhz or less.

According to some aspects of the present disclosure, a threshold value used as a criterion for limiting the operating frequency of the control target FB may correspond to a lowest operating frequency corresponding to a minimum value in the FPS range in which the user of the electronic system 1 (see FIG. 1) does not perceive a frame drop. For example, the threshold value may be a lowest operating frequency corresponding to a minimum value within a preset FPS range. Embodiments are not limited thereto, and the threshold value may also correspond to all operating frequencies corresponding to the FPS range in which the user of the electronic system 1 (see FIG. 1) does not perceive a frame drop.

While a case where the control target FB is the second type core 113 (see FIG. 2) has been described above as an example, embodiments are not limited thereto, and the control target FB may vary depending on embodiments of the present disclosure. In addition, the number of control target FBs may be two or more depending on embodiments of the present disclosure. For example, the DVFS controller 160 (see FIG. 3) may perform throttling by limiting the temperature of FB 1 to a first threshold value or less and limiting the temperature of FB 2 to a second threshold value or less.

While a case where the operating frequency of the control target FB is limited based on one threshold value has been described above as an example, embodiments of the present disclosure are not limited thereto, and the number of threshold values may also be two or more.

For example, when the temperature of FB 1 is equal to or higher than a first temperature T1, the operating frequency of FB 1 may be limited to a first threshold value V1 or less. In addition, when the temperature of FB 1 is equal to or lower than the first temperature and equal to or higher than a second temperature, the operating frequency of FB 1 may be limited to a second threshold value V2 or less. In addition, when the temperature of FB 1 is equal to or lower than the second temperature and equal to or higher than a third temperature, the operating frequency of FB 1 may be limited to a third threshold value V3 or less. Here, T1>T2>T3 and V3>V2>V1.

As described above, by setting two or more threshold values used as criteria for limiting the operating frequency of an FB, it is possible to delay a time when the SoC 100 (see FIG. 1) reaches a throttling level compared with when only one threshold value is set.

Figure 8:
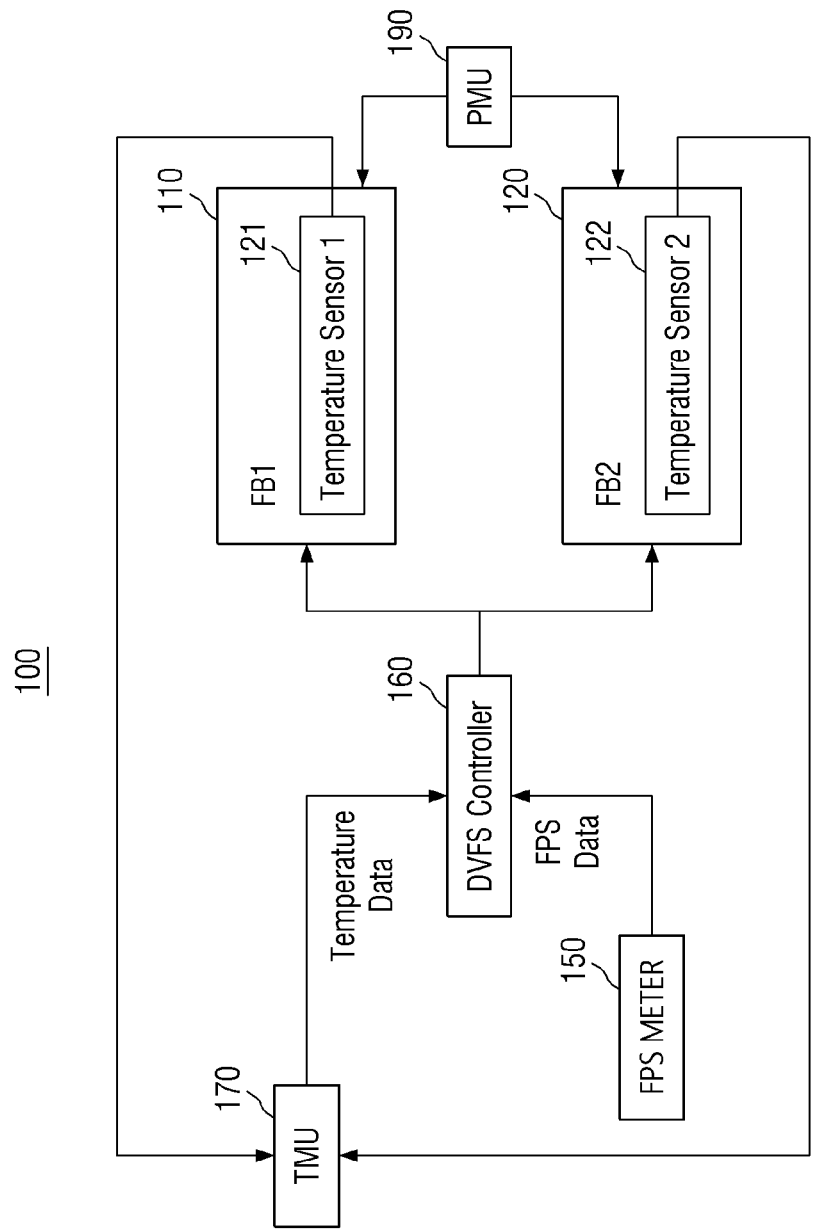
FIG. 8 is a block diagram illustrating the operation of an SoC 100 according to embodiments of the present disclosure.

FIG. 8 is a block diagram illustrating the operation of an SoC 100 according to embodiments of the present disclosure. A redundant description of elements and features described above may be omitted below.

Referring to FIG. 8, a PMU 190 may independently control the power of FB 1 110 and FB 2 120. For example, the PMU 190 may turn off the power of any one of FB 1 110 and FB 2 120 to perform a throttling operation. Here, the PMU 190 may perform throttling by turning off an FB (hereinafter, referred to as a target FB), which operates at a relatively low frequency among FBs and may be unnecessary in a specific operation (e.g., 3D game, video call, camera operation, etc.) being performed by the electronic system 1 (see FIG. 1).

For example, if FB 1 110 is a first type core 112 (see FIG. 2) and FB 2 120 is a second type core 113 (see FIG. 2), the PMU 190 may turn off the power of the first type core 112 (see FIG. 2), and a DVFS controller 160 may limit the operating frequency of the second type core 113 (see FIG. 2) to a threshold value or less.

In this way, when throttling is performed on the SoC 100 (see FIG. 1) by turning off (as illustrated in FIG. 8) the power of an FB that operates at a low frequency and may be unnecessary for the operation of the electronic system 1 (see FIG. 1) in addition to limiting the operating frequency of a control target FB (as illustrated in FIG. 3), the threshold value used as a criterion for limiting the operating frequency of the control target FB can be increased compared with the threshold value in FIG. 3. Therefore, a frame drop of the electronic system 1 (see FIG. 1) can be reduced. In some examples, the frame drop of the electronic system 1 (see FIG. 1) may not be perceived by a user of the electronic system 1.

Figure 9:
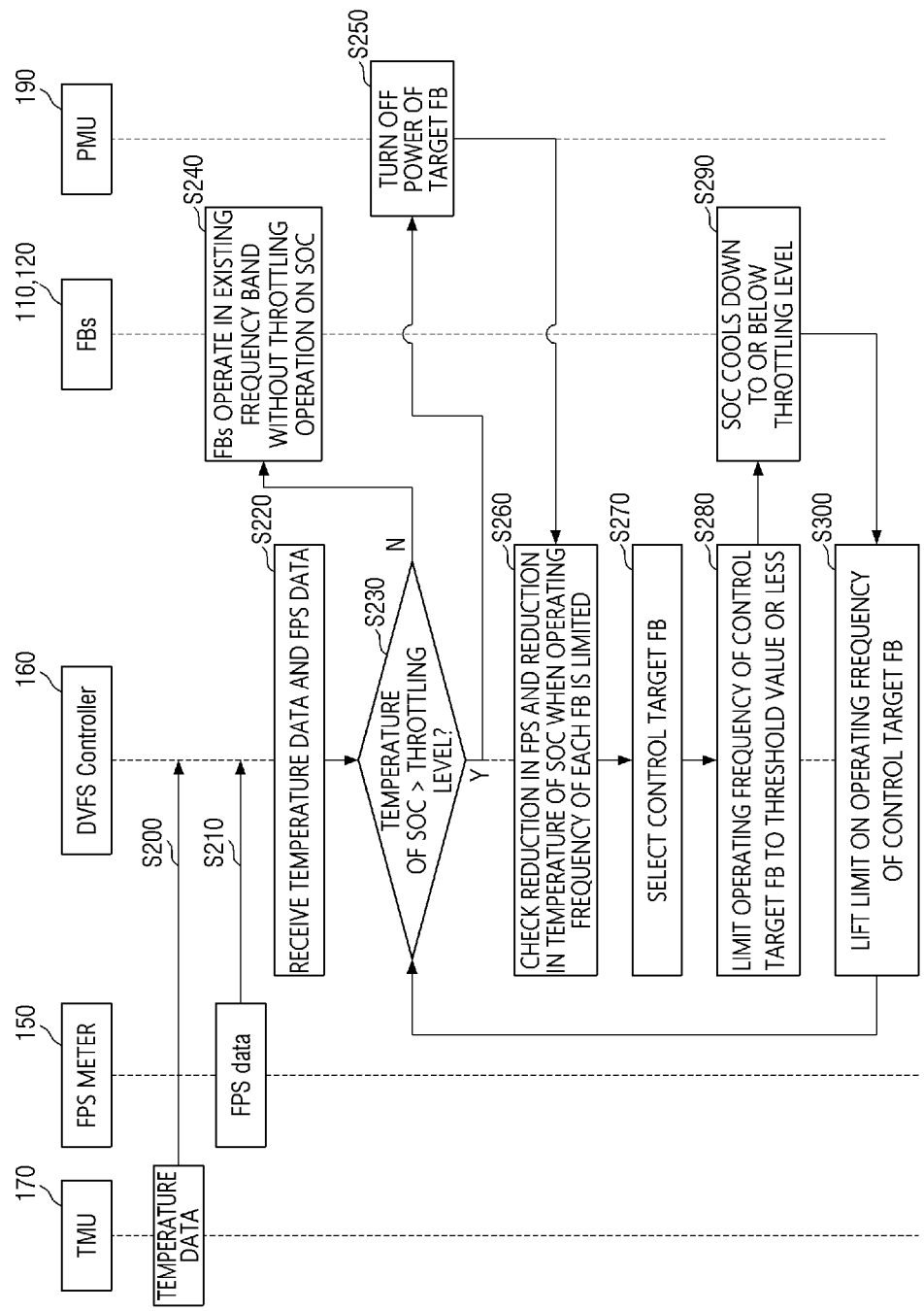
FIG. 9 is a flowchart illustrating the operation of the SoC 100 of FIG. 8.

FIG. 9 is a flowchart illustrating the operation of the SoC 100 of FIG. 8.

Referring to FIG. 9, when a TMU 170 operates, it may transmit temperature data of the FB 1 110 and FB 2 120 to the DVFS controller 160 (operation S200). An FPS meter 150 may transmit FPS data based on data processed by the FB 1 110 and FB 2 120 to the DVFS controller 160 (operation S210).

The DVFS controller 160 may receive the temperature data of the FB 1 110 and FB 2 120 from the TMU 170 and the FPS data from the FPS meter 150 (operation S220). Then, the DVFS controller 160 may determine whether the temperature of the SoC 100 (see FIG. 1) is higher than a throttling level based on the temperature data of the FB 1 110 and FB 2 120 (operation S230).

If it is determined that the temperature of the SoC 100 (see FIG. 1) is not higher than the throttling level (operation S230-N), a throttling operation may not be performed on the SoC 100 (see FIG. 1), and the DVFS controller 160 may not limit operating frequencies of the FB 1 110 and FB 2 120 (operation S240). If it is determined that the temperature of the SoC 100 (see FIG. 1) is higher than the throttling level (operation S230-Y), the PMU 190 may turn off the power of a target FB (operation S250). Then, the DVFS controller 160 may check a reduction in FPS and a reduction in the temperature of the SoC 100 (see FIG. 1) when the operating frequency of each of the FB 1 110 and FB 2 120 is limited (operation S260).

The DVFS controller 160 may select a control target FB, which can limit a reduction in FPS and effectively reduce the temperature of the SoC 100 (see FIG. 1) in a case where a temperature of the SoC 100 exceeds a threshold value, when the operating frequency of each of the FB 1 110 and FB 2 120 is limited (operation S270).

The DVFS controller 160 may limit the operating frequency of the control target FB to a threshold value or less (operation S280). Accordingly, the SoC 100 (see FIG. 1) may cool down to a temperature at or below the threshold value or the throttling level (operation S290). Therefore, the user of the electronic system 1 (see FIG. 1) equipped with the SoC 100 (see FIG. 1) may not perceive a frame drop, and the safety of the electronic system 1 (see FIG. 1) may be ensured.

Next, in response to the temperature of the SoC 100 (see FIG. 1) sensed by the TMU 170 dropping to or below the throttling level, the DVFS controller 160 may lift the limit on the operating frequency of the control target FB (operation S300).

FIG. 10 is an exemplary diagram for explaining an effect according to embodiments of the present disclosure.

Referring to FIG. 10, when the operating frequency of a control target FB (e.g., FB 2) is limited to a threshold value (e.g., 600 Mhz) or less, a throttling count of the SoC 100 (see FIG. 1) may be reduced compared with when the operating frequency of the control target FB is not limited. For example, the throttling count may be 55 when the operating frequency of FB2 is not limited, that is, when FB 2 operates at a default operating frequency of 1.5 Ghz and may be 6 when the operating frequency of FB 2 is limited to the threshold value (e.g., 600 Mhz) or less. As the throttling count of the SoC 100 (see FIG. 1) decreases, the degree and number of frame drops of the electronic system 1 (see FIG. 1) may decrease.

Figure 11:
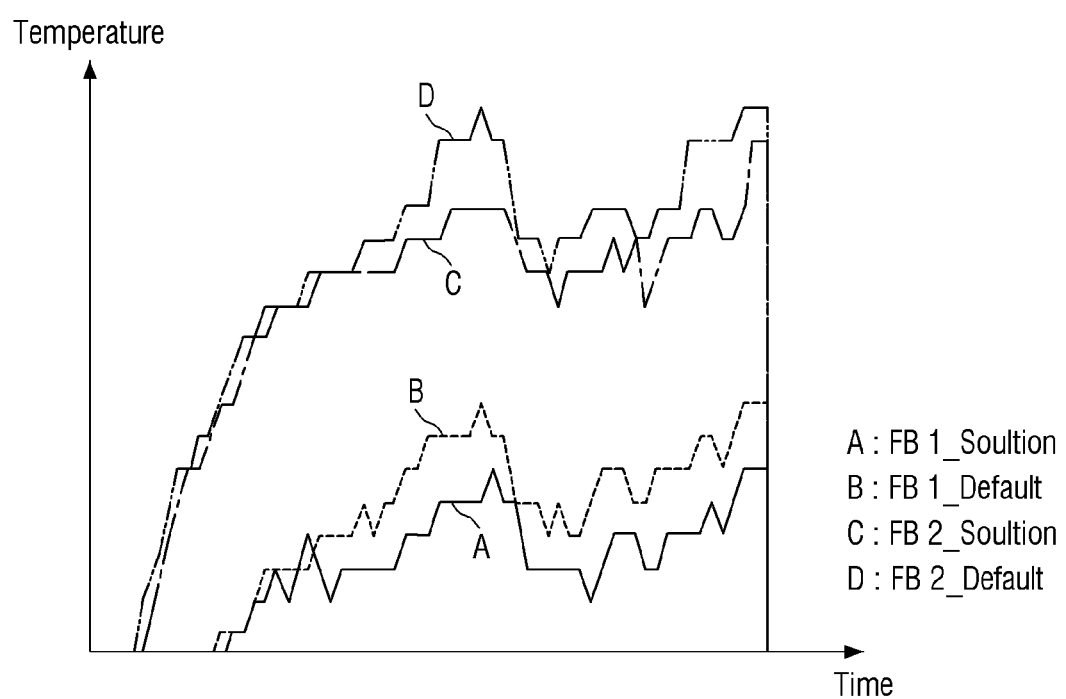
FIG. 11 is an exemplary diagram for explaining an effect according to embodiments of the present disclosure.

FIG. 11 is an exemplary diagram for explaining an effect according to embodiments of the present disclosure. A case where the operating frequency of FB 1 is limited to a threshold value or less and the operating frequency of FB 2 is not limited will now be described as an example. Here, a reduction in FPS when the operating frequency of FB 1 is limited may be smaller than a reduction in FPS when the operating frequency of FB 2 is limited. In addition, a reduction in the temperature of the SoC 100 (see FIG. 1) when the operating frequency of FB 1 is limited may be greater than a reduction in the temperature of the SoC 100 when the operating frequency of FB 2 is limited. In addition, a frame drop of the electronic system 1 (see FIG. 1) when the operating frequency of FB 2 is limited may be greater than a frame drop of the electronic system 1 (see FIG. 1) when the operating frequency of FB 1 is limited.

Referring to FIG. 11, plot A (FB 1_Solution) illustrates the temperature of FB 1 when the operating frequency of FB 1 is limited to a threshold value or less. Plot B (FB 1_Default) illustrates the temperature of FB 1 when the operating frequency of FB 1 is not limited. Plot C (FB 2_Solution) illustrates the temperature of FB 2 when the operating frequency of FB 1 is limited to the threshold value or less. Plot D (FB 2_Default) illustrates the temperature of FB 2 when the operating frequency of FB 1 is not limited.

Since a plurality of FBs are integrated in the SoC 100 (see FIG. 1), they may be affected by each other's temperature. Here, when the operating frequency of FB 2 is limited, a frame drop of the electronic system 1 (see FIG. 1) may be relatively large. Therefore, throttling may be performed by limiting the operating frequency of FB 1 which has relatively little effect on performance.

The time when the temperature of FB 2 rises may be delayed when the operating frequency of FB 1 is limited to the threshold value or less as compared with when the operating frequency of FB 1 is not limited. Accordingly, the time when the SoC 100 (see FIG. 1) reaches a throttling level may also be delayed. Therefore, high-capacity work requiring a high operating voltage and a high operating frequency may be completed before the user of the electronic system 1 (see FIG. 1) perceives a frame drop. Accordingly, the SoC 100 (FIG. 1) can be automatically cooled down.

Figure 12:
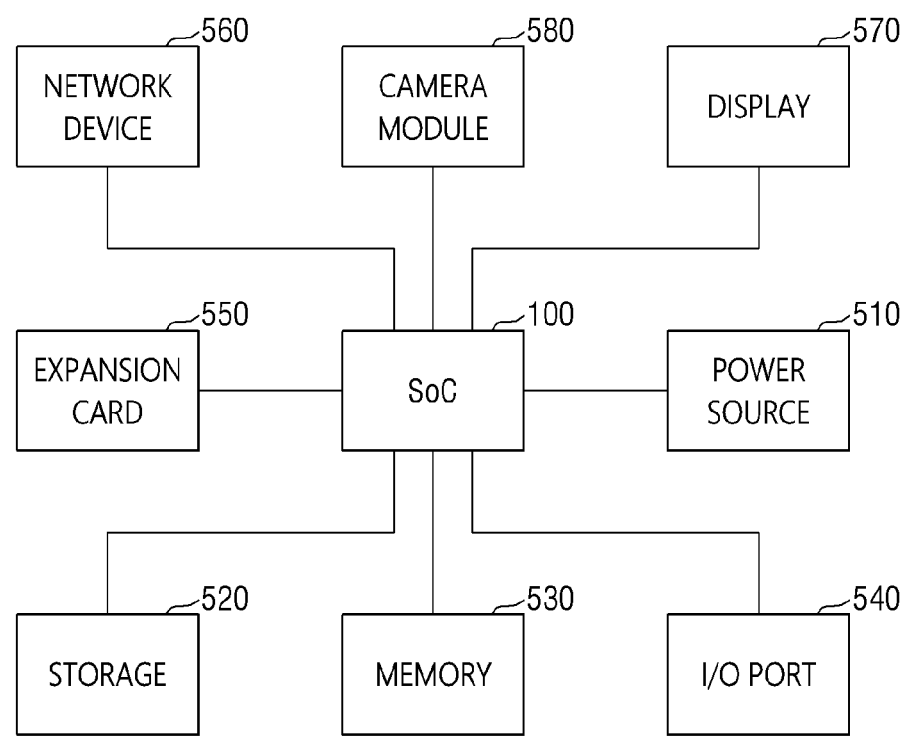
FIG. 12 is a block diagram of an embodiment of an electronic system including an SoC 100 according to embodiments of the present disclosure.

FIG. 12 is a block diagram of an embodiment of an electronic system including an SoC 100 according to embodiments of the present disclosure.

Referring to FIG. 12, the electronic system may be implemented as a PC, a data server, or a portable electronic device. The portable electronic device may be implemented as a laptop computer, a mobile phone, a smartphone, a tablet PC, a PDA, an EDA, a digital still camera, a digital video camera, a PMP, a PND (personal navigation device or portable navigation device), a handheld game console, or an e-book. The electronic system may include the SoC 100, a power source 510, a storage 520, a memory 530, an input/output port 540, an expansion card 550, a network device 560, and a display 570. According to an embodiment of the present disclosure, the electronic system may further include a camera module 580. The SoC 100 may include the CPU 111 illustrated in FIG. 2. Here, the CPU 111 may be a multi-core processor. The SoC 100 may control the operation of, for example, at least one of the power source 510, the storage 520, the memory 530, the input/output port 540, the expansion card 550, the network device 560, the display 570, and the camera module 580. The power source 510 may supply an operating voltage to at least one of the SoC 100, the storage 520, the memory 530, the input/output port 540, the expansion card 550, the network device 560, the display 570, and the camera module 580. The storage 520 may be implemented as a hard disk drive or a solid state drive (SSD). The memory 530 may be implemented as a volatile memory or a non-volatile memory and may correspond to the external memory 200 of FIG. 1. According to an embodiment of the present disclosure, a memory controller 210 (see FIG. 1) that can control a data access operation, for example, a read operation, a write operation (or a program operation) or an erase operation, to the memory 530 may be integrated or embedded in the SoC 100. According to an embodiment of the present disclosure, the memory controller 210 (see FIG. 1) may be implemented between the SoC 100 and the memory 530. The input/output port 540 refers to ports that can transmit data to the electronic system or transmit data output from the electronic system to an external device. For example, the input/output port 540 may be a port for connecting a pointing device such as a computer mouse, a port for connecting a printer, or a port for connecting a USB drive. The expansion card 550 may be implemented as a secure digital (SD) card or a multimedia card (MMC). According to an embodiment of the present disclosure, the expansion card 550 may be a subscriber identification module (SIM) card or a universal subscriber identity module (USIM) card. The network device 560 refers to a device that can connect the electronic system to a wired network or a wireless network. The display 570 may display data output from the storage 520, the memory 530, the input/output port 540, the expansion card 550, or the network device 560. The display 570 may be the display device 300 of FIG. 1. The camera module 580 refers to a module that can convert an optical image into an electrical image. Therefore, the electrical image output from the camera module 580 may be stored in the storage 520, the memory 530, or the expansion card 550. In addition, the electrical image output from the camera module 580 may be displayed through the display 570.

While the present disclosure has been particularly illustrated and described with reference to exemplary embodiments thereof, it will be understood by those of ordinary skill in the art that various changes in form and detail may be made therein without departing from the spirit and scope of the present disclosure as defined by the following claims.

The exemplary embodiments should be considered in a descriptive sense only and not for purposes of limitation.

What is claimed is:

1. A system on chip (SoC) comprising:
   a plurality of functional blocks;
   a frames per second (FPS) meter measuring FPS based on data processed by the functional blocks;
   a thermal management unit (TMU) sensing a temperature of each of the functional blocks;
   a dynamic voltage frequency scaling (DVFS) controller performing DVFS on the functional blocks; and
   a power management unit (PMU) independently controlling a power of each of the functional blocks,
   wherein the DVFS controller determines a reduction of the FPS for the functional blocks and a reduction of the temperature of the SoC corresponding to when an operating frequency of at least one of the functional blocks is limited, and limits the operating frequency of the at least one of the functional blocks to a threshold value or less based on the determination.

2. The SoC of claim 1, wherein the threshold value is a lowest operating frequency corresponding to a minimum value within a preset FPS range.

3. The SoC of claim 1, wherein in response to at least one of the temperatures of the functional blocks sensed by the TMU reaching a throttling level, the DVFS controller performs the determination of performance data for each functional block of the plurality of functional blocks and selects the at least one of the functional blocks, which causes a smallest reduction in the FPS when the operating frequency thereof is limited, from among the plurality of functional blocks, and maintains the temperatures of the plurality of functional blocks at or below the throttling level by limiting the operating frequency of the at least one functional block selected by the DVFS controller to the threshold value or less.

4. The SoC of claim 1, wherein the functional blocks comprise a first functional block and a second functional block, and the DVFS controller limits an operating frequency of the first functional block to the threshold value or less and does not limit an operating frequency of the second functional block to the threshold value or less in response to the determination and a first reduction in the FPS when the operating frequency of the first functional block is limited being smaller than a second reduction in the FPS when the operating frequency of the second functional block is limited and in response to the determination and a first reduction in the temperature of the first functional block when the operating frequency of the first functional block is limited being greater than a second reduction in the temperature of the second functional block when the operating frequency of the second functional block is limited.

5. The SoC of claim 4, wherein the operating frequency of the first functional block is limited to a first threshold value or less when the temperature of the first functional block is equal to or higher than a first temperature, the operating frequency of the first functional block is limited to a second threshold value or less when the temperature of the first functional block is equal to or lower than the first temperature and equal to or higher than a second temperature, and the operating frequency of the first functional block is limited to a third threshold value or less when the temperature of the first functional block is equal to or lower than the second temperature and equal to or higher than a third temperature, wherein the first temperature is higher than the second temperature, the second temperature is higher than the third temperature, the first threshold value is less than the second threshold value, and the second threshold value is less than the third threshold value.

6. The SoC of claim 4, wherein the functional blocks further comprise a third functional block, a third reduction in the FPS when an operating frequency of the third functional block is limited is greater than the second reduction in the FPS when the operating frequency of the second functional block is limited, and a time when the temperature of the third functional block rises is delayed when the operating frequency of the first functional block is limited to the threshold value or less compared with when the operating frequency of the first functional block is not limited to the threshold value or less.

7. The SoC of claim 1, wherein the functional blocks comprise a first functional block and a second functional block, the PMU turns off the power of the first functional block in response to an operating frequency of the first functional block being lower than an operating frequency of the second functional block, and the DVFS controller limits the operating frequency of the second functional block to the threshold value or less in response to the determination and a first reduction in the FPS when the operating frequency of the first functional block is limited being greater than a second reduction in the FPS when the operating frequency of the second functional block is limited and in response to the determination and a reduction in the temperature of the first functional block when the operating frequency of the first functional block is limited being smaller than a reduction in the temperature of the second functional block when the operating frequency of the second functional block is limited.

8. The SoC of claim 1, wherein the functional blocks comprise a first functional block and a second functional block, and the temperature of the functional blocks is maintained at or below a throttling level by performing a first operation using the PMU or performing a second operation using the DVFS controller in response to the temperature of the first functional block and the second functional block sensed by the TMU reaching the throttling level, wherein the first operation comprises an operation of turning off the power of the first functional block using the PMU in response to an operating frequency of the first functional block being lower than an operating frequency of the second functional block, and the second operation comprises an operation of limiting the operating frequency of the second functional block to the threshold value or less using the DVFS controller in response to the determination and a first reduction in FPS when the operating frequency of the first functional block is limited being greater than a second reduction in FPS when the operating frequency of the second functional block is limited and in response to the determination and a reduction in the temperature of the first functional block when the operating frequency of the first functional block is limited being smaller than a reduction in the temperature of the second functional block when the operating frequency of the second functional block is limited.

9. A system on chip (SoC) comprising:
a first functional block;
a second functional block;
an FPS meter measuring FPS based on data processed by the first functional block and the second functional block;
a TMU sensing a first temperature of the first functional block and a second temperature of the second functional block; and
a DVFS controller performing DVFS on the first functional block and the second functional block,
wherein the DVFS controller limits an operating frequency of the first functional block to a threshold value or less and does not limit an operating frequency of the second functional block to the threshold value or less in response to a first reduction in the FPS when the operating frequency of the first functional block is limited being smaller than a second reduction in the FPS when the operating frequency of the second functional block is limited and in response to a reduction in the temperature of the first functional block when the operating frequency of the first functional block is limited being greater than a reduction in the temperature of the second functional block when the operating frequency of the second functional block is limited.

10. The SoC of claim 9, wherein in response to the first temperature of the first functional block and the second temperature of the second functional block sensed by the TMU dropping to or below a throttling level, the DVFS controller lifts the limit on the operating frequency of the first functional block.

11. The SoC of claim 9, wherein the threshold value is a lowest operating frequency corresponding to a minimum value within a preset FPS range, and a throttling count when the operating frequency of the first functional block is limited to the threshold value or less is less than a throttling count when the operating frequency of the first functional block is not limited to the threshold value or less.

12. A semiconductor device comprising:
a system on chip (SoC) comprising a plurality of functional blocks; and
a display device configured for displaying an image based on data processed by the functional blocks,
wherein the SoC comprises:
a frames per second (FPS) meter measuring FPS based on the image;
a thermal management unit (TMU) sensing temperatures of the functional blocks;
and
a dynamic voltage frequency scaling (DVFS) controller performing DVFS on the functional blocks,
wherein the DVFS controller checks data indicative of a reduction of the FPS for the functional blocks and a reduction of the temperature of the SoC corresponding to when an operating frequency of each of the functional blocks is limited, and limits the operating frequency of at least one of the functional blocks to a first threshold value or less based on the check.

13. The semiconductor device of claim 12, wherein the functional blocks comprise a first functional block and a second functional block, and in response to the temperature sensed by the TMU reaching a throttling level, the DVFS controller limits an operating frequency of the first functional block to the first threshold value or less and does not limit an operating frequency of the second functional block in response to the check and a first reduction in the FPS when the operating frequency of the first functional block is limited being smaller than a second reduction in the FPS when the operating frequency of the second functional block is limited and in response to the check and a reduction in the temperature of the SoC when the operating frequency of the first functional block is limited being greater than a reduction in the temperature of the SoC when the operating frequency of the second functional block is limited.

14. The semiconductor device of claim 13, wherein a throttling count of the SoC when the operating frequency of the first functional block is limited to the first threshold value or less is less than a throttling count of the SoC when the operating frequency of the first functional block is not limited to the first threshold value or less.

15. The semiconductor device of claim 13, wherein a time when the SoC reaches the throttling level is delayed when the operating frequency of the first functional block is limited to the first threshold value or less compared with when the operating frequency of the first functional block is not limited to the first threshold value or less.

16. The semiconductor device of claim 12, wherein each of the functional blocks comprises a temperature sensor measuring the temperature of the functional block, the temperature sensor transmits the temperature of each functional block to the TMU, the TMU transmits the temperature data of each functional block to the DVFS controller, and the DVFS controller determines, upon performing the check, whether to perform a throttling operation on the SoC based on the temperature of each functional block.

17. The semiconductor device of claim 12, wherein the functional blocks comprise a first functional block and a second functional block, and the DVFS controller limits an operating frequency of the first functional block to the first threshold value or less and does not limit an operating frequency of the second functional block to the first threshold value or less in response to the check and a reduction in the FPS of the display device when the operating frequency of the first functional block is limited being smaller than a reduction in the FPS of the display device when the operating frequency of the second functional block is limited and in response to the check and a reduction in the temperature of the SoC when the operating frequency of the first functional block is limited being greater than a reduction in the temperature of the SoC when the operating frequency of the second functional block is limited.

18. The semiconductor device of claim 17, wherein the first threshold value is a lowest operating frequency corresponding to a minimum value within a preset FPS range.

19. The semiconductor device of claim 18, wherein the SoC further comprises a power management unit (PMU) independently controlling power of the first functional block and the second functional block, and the PMU turns off the power of the first functional block in response to the operating frequency of the first functional block being lower than the operating frequency of the second functional block.

20. The semiconductor device of claim 19, wherein the DVFS controller limits the operating frequency of the first functional block to be equal to or less than a second threshold value greater than the first threshold value and does not limit the operating frequency of the second functional block to the second threshold value or less.

* * * * *